(12) United States Patent
Clemens et al.

(10) Patent No.: US 6,823,226 B2
(45) Date of Patent: Nov. 23, 2004

(54) MATRIX METHODS AND SYSTEMS FOR SUPPLY CHAIN MANAGEMENT

(75) Inventors: Achim Clemens, Hockenheim (DE); Thomas Kern, Rauenberg (DE)

(73) Assignee: SAP Aktiengesellschaft, Walldorf (DE)

( * ) Notice: Subject to any disclaimer, the term of this patent is extended or adjusted under 35 U.S.C. 154(b) by 594 days.

(21) Appl. No.: 09/819,658

(22) Filed: Mar. 29, 2001

(65) Prior Publication Data

US 2002/0007293 A1 Jan. 17, 2002

Related U.S. Application Data

(60) Provisional application No. 60/193,693, filed on Mar. 31, 2000.

(51) Int. Cl.⁷ .......................... G06F 17/60; G06F 19/00
(52) U.S. Cl. .......................... 700/99; 700/97; 700/107; 705/7; 705/29
(58) Field of Search .................... 700/97, 99, 101, 700/106, 107; 705/5, 7, 29

(56) References Cited

U.S. PATENT DOCUMENTS

| | | | | |
|---|---|---|---|---|
| 4,827,423 A | * | 5/1989 | Beasley et al. | 700/96 |
| 5,369,570 A | * | 11/1994 | Parad | 705/8 |
| 6,151,582 A | * | 11/2000 | Huang et al. | 705/8 |
| 6,192,370 B1 | * | 2/2001 | Primsch | 707/103 R |
| 6,223,094 B1 | * | 4/2001 | Muehleck et al. | 700/107 |
| 6,272,389 B1 | * | 8/2001 | Dietrich | 700/101 |
| 6,338,097 B1 | * | 1/2002 | Krenzke et al. | 719/329 |
| 6,434,443 B1 | * | 8/2002 | Lin | 700/100 |
| 6,477,660 B1 | * | 11/2002 | Sohner | 714/1 |

FOREIGN PATENT DOCUMENTS

| | | |
|---|---|---|
| WO | WO 00/13115 | 3/2000 |

OTHER PUBLICATIONS

"SAP Delivers SAP APO, Cornerstone of Synchronized Planning and Execution Components of Supply Chain Management Solution; New Components Extend Supply Chain Capabilities", Business Wire, Sep. 14, 1999, pp. 1–4, downloaded from Proquest.*

"New Rapid Planning Matrix Function in the SAP Automotive Solution Exceeds Peformance Tests for High–Volume Manufacturing Requirements of Daimler–Chrysler", Business Wire, Aug. 17, 1999, pp. 1–3, downloaded from Proquest.*

"mySAP.com Automotive Puts the New BMW X5 Sport Utility Vehicle On the Road, BMW Benefits From One–Month Implementation of mySAP.com Automotive", Busines Wire, Nov. 6, 2000, pp. 1–3, downloaded from Proquest.*

* cited by examiner

*Primary Examiner*—Emanuel Todd Voeltz
(74) *Attorney, Agent, or Firm*—Finnegan Henderson Farabow Garrett & Dunner, L.L.P.

(57) ABSTRACT

A system and method of receiving orders, placing orders in an order matrix, determining potential production periods for an order, rescheduling orders, and generating a bill of materials. The method receives an order having one or more tokens out of a set of possible tokens. Each token is a combination of a characteristic and a value of the characteristic. The orders are placed in an order matrix. An order restriction matrix for the orders is generated based on certain selection conditions. The method then examines the restrictions that apply to the order and derives an order derived production restriction matrix for the order, which is evaluated to determine possible production periods for the order. The order matrix may also be used to generate a bill of materials.

52 Claims, 8 Drawing Sheets

|  | Order 1 | Order 2 |  | Order n |
|---|---|---|---|---|
| Token 1 | 1 | 1 | 1 | 0 |
| Token 2 | 1 | 0 | 0 | 1 |
| Token 3 | 1 | 1 | 0 | 1 |
|  |  |  |  |  |
| Token n | 0 | 1 | 1 | 0 |

Figure 2

|  | Order 1 | Order 2 |  | Order n |
|---|---|---|---|---|
| Restriction 1 | 0 | 0 | 1 | 0 |
| Restriction 2 | 0 | 1 | 0 | 1 |
| Restriction 3 | 1 | 0 | 0 | 1 |
|  |  |  |  |  |
| Restriction n | 1 | 1 | 1 | 0 |

Figure 3

|  | Period 1 | Period 2 |  | Period n |
|---|---|---|---|---|
| Restriction 1 | 12 | 6 | 0 | 19 |
| Vector 1 | 1 | 1 | 0 | 1 |
| Restriction 2 | 0 | 0 | 2 | 23 |
| Vector 2 | 0 | 0 | 1 | 1 |
| Restriction n | 0 | 0 | 6 | 2 |
| Vector n | 0 | 0 | 1 | 1 |

Figure 4

|  | Period 1 | Period 2 |  | Period n |
|---|---|---|---|---|
| Pointer to Restriction1 | 12 | 6 | 0 | 19 |
| Pointer to Vector 1 | 1 | 1 | 0 | 1 |
| Pointer to Restriction2 | 0 | 0 | 2 | 23 |
| Pointer to Vector 2 | 0 | 0 | 1 | 1 |
| Result Vector | 0 | 0 | 0 | 1 |

Figure 5

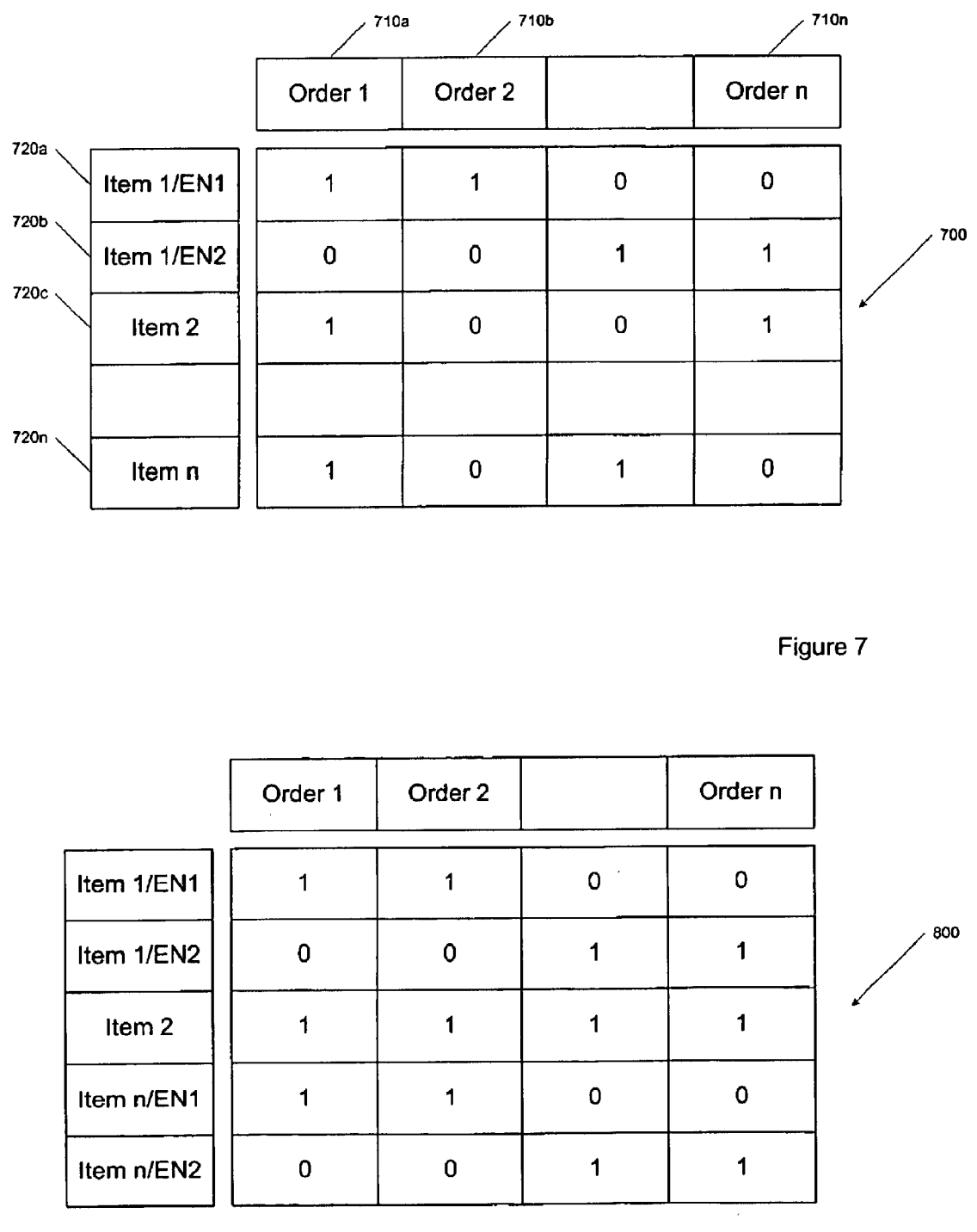

|  | Order 1 | Order 2 |  | Order n |
|---|---|---|---|---|
| Item 1/EN1 | 1 | 1 | 0 | 0 |
| Item 1/EN2 | 0 | 0 | 1 | 1 |
| Item 2 | 1 | 0 | 0 | 1 |
|  |  |  |  |  |
| Item n | 1 | 0 | 1 | 0 |

Figure 7

|  | Order 1 | Order 2 |  | Order n |
|---|---|---|---|---|
| Item 1/EN1 | 1 | 1 | 0 | 0 |
| Item 1/EN2 | 0 | 0 | 1 | 1 |
| Item 2 | 1 | 1 | 1 | 1 |
| Item n/EN1 | 1 | 1 | 0 | 0 |
| Item n/EN2 | 0 | 0 | 1 | 1 |

Figure 8

MATRIX METHODS AND SYSTEMS FOR SUPPLY CHAIN MANAGEMENT

CROSS-REFERENCE TO RELATED APPLICATIONS

This application claims priority benefits based on U.S. Provisional Application 60/193,693, filed Mar. 31, 2000, the technical disclosure of which is incorporated herein by reference.

FIELD OF THE INVENTION

This invention relates generally to methods and systems for supply chain management and, more particularly, to methods and systems for supply chain management using bit storage and calculations.

BACKGROUND OF THE INVENTION

In supply chain management, one goal is to have real time reaction up and down the supply chain. For example, many industries have moved to just-in-time models to supply parts to assembly line positions and warehouse inventories. Just-in-time supply models are cost efficient because they keep inventory low and allow quick reaction by the manufacturers to configuration changes. These same manufacturers, however, must constantly adjust the supply chain to ensure that no valuable production time is lost because an assembly line runs out of a necessary part. At the same time, customers have become more demanding and frequently demand an accurate promised delivery date of an ordered product. Often, the customer makes last minute changes to the configuration, yet still expects the same promised delivery date to be met.

Many manufacturers have complex product lines that comprise dozens of products with each product line requiring thousands of material components. For example, in automobile manufacturing most of the major producers carry a product line consisting of four to eight different models of automobiles. Design choices produce multiple combinations of possible automobiles. For instance, each automobile may come in six different exterior colors, three different interior colors, and three different model classes (such as low end, medium end, and deluxe). A typical automobile manufacturer produces very few cars with the exact same configuration. For instance, one European manufacturer has automobiles with over 300 different characteristics, each characteristic having up to five different values; thus, this manufacturer theoretically may have up to $5^{300}$ different configurations. Manufacturers estimate that only between 2 and 8 cars have the same configuration.

In the effort to maintain customer satisfaction by accurately predicting a delivery date, manufacturers also want to be able to quickly manage the supply chain so as to be able to react quickly to market preferences and changes forced by suppliers. If the manufacturer makes changes to the configuration or enhances the product, the manufacturer would like to put the product into production as soon as possible, without leaving excess inventory in the warehouse. Also, manufacturers must be able to react quickly to changes forced by suppliers to prevent gaps in the supply chain that change capacity restrictions or require orders to be rescheduled. Examples of such changes include a shortage of raw materials by suppliers, strikes, accidents or natural disasters. When such a change occurs, manufacturers would like to be able to react quickly by rescheduling all orders to reflect the change.

Conventional systems typically store configuration data in SQL tables in relational form. Operations on the database are performed using time-consuming SQL functions. With the sheer volume of configuration and customer order information, such databases are slow and unwieldy to update. The typical automobile manufacturer may handle, for example, up to 14 million orders over a typical year, with thousands of characteristic values, such as interior and exterior color, resulting in a large variance of configurations.

Additionally, in conventional SQL systems, each order is stored using a different byte of information for each characteristic. Consequently, the order database must be large, and the writing and reading of such a large amount of information consumes a lot of run time and may require days to update. For this reason, the supply chain management systems of larger manufacturers often run updates to configurations and orders only every two weeks and limit the calculations to weekends. If updates are performed in real time, the system runs the risk of inaccurate supple levels or estimated delivery dates. In the automobile manufacturer example, for instance, hundreds of dealers are drawing from the same system at the same time. It is possible that dealers will promise a customer one delivery date based on old data, then when the database is updated see that the particular product is sold out and therefore have to disappoint the customer by changing the estimated delivery date.

SUMMARY OF A FEW ASPECTS OF THE INVENTION

In accordance with the invention, methods and system for generating an order matrix are provided that receives an order comprising one or more tokens out of a set of possible tokens, wherein a token is a combination of a characteristic and a value of the characteristic. Order are placed in an order matrix, wherein the order matrix is at least a two dimensional data structure, each row of the data structure representing a possible token and each column of the data structure representing an order.

Also, methods and systems for determining a production period for rescheduling a plurality of orders are given. The method first receives a plurality of orders having one or more tokens out of a set of possible tokens. Each token is a combination of a characteristic and a value of the characteristic. Next, an order restriction matrix is generated. The order restriction matrix is a two dimensional data structure with each row of the data structure representing a possible restriction and each column of the data structure representing an order. The method looks up the restrictions that apply to the orders and derives an order derived production restriction matrix for each order, which is evaluated to determine possible production periods for each order.

Also, methods and systems for determining potential production periods for a potential order are given. The method receives an order having one or more tokens out of a set of possible tokens. Each token is a combination of a characteristic and a value of the characteristic. For the order, one or more restrictions are determined based on the tokens. This series of restrictions is used to generate an order derived production restriction matrix for the order, which is evaluated to determine possible production periods for the order.

Also, methods and systems for generating a bill of materials for a production run are shown. The method receives a plurality of orders comprising one or more tokens out of a set of possible tokens, wherein a token is a combination of a characteristic and a value of the characteristic. It places the orders in an order matrix, wherein the order matrix is at least a two dimensional data structure, each row of the data structure representing a possible token and each column of the data structure representing an order. Next, a bill of materials matrix is generated by evaluating the order matrix, wherein the bill of materials matrix is at least a two dimensional data structure, each row of the data structure representing a possible item and each column of the data structure representing an order.

The foregoing summarizes only a few aspects of the invention and is not intended to be reflective of the full scope of the invention as claimed. Additional features and advantages of the invention are set forth in the following description, may be apparent from the description, or may be learned by practicing the invention. Moreover, both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate one embodiment of the invention and together with the description, serve to explain the principles of the invention.

FIG. 2 illustrates an order matrix consistent with an embodiment of the present invention.

FIG. 3 illustrates an order restriction matrix in an exemplary embodiment of the present invention.

FIG. 4 illustrates a production restriction matrix in an exemplary embodiment of the present invention.

FIG. 5 illustrates an order derived production restriction matrix in an exemplary embodiment of the present invention.

FIG. 7 illustrates a bill of materials matrix consistent with an embodiment of the present invention FIG. 8 illustrates an effectivity matrix consistent with an embodiment of the present invention.

DESCRIPTION OF THE PREFERRED EMBODIMENTS

Reference will now be made in detail to the present exemplary embodiments of the invention, examples of which is are illustrated in the accompanying drawings. Wherever possible, the same reference numbers will be used throughout the drawings to refer to the same or like parts.

The present invention recites methods and systems for supply chain management using bit matrix calculations and storage of data. In an exemplary embodiment, the storage of data is done in matrix form using bit arrays. Each order, for example, can be described using a set of tokens. A "token" is a combination of a characteristic and the value for that characteristic. In the automobile example, a customer may order an auto that is either red, green, or blue. The transmission may be "standard" or "automatic" and model may be perhaps "basic," "regular," or "luxury." In this example, color, transmission and model are all characteristics. If a customer chooses an auto that is red, with standard transmission, in a luxury model, the order will consists of three tokens: (color=red), (transmission=standard), and (model=luxury).

Figure 1:
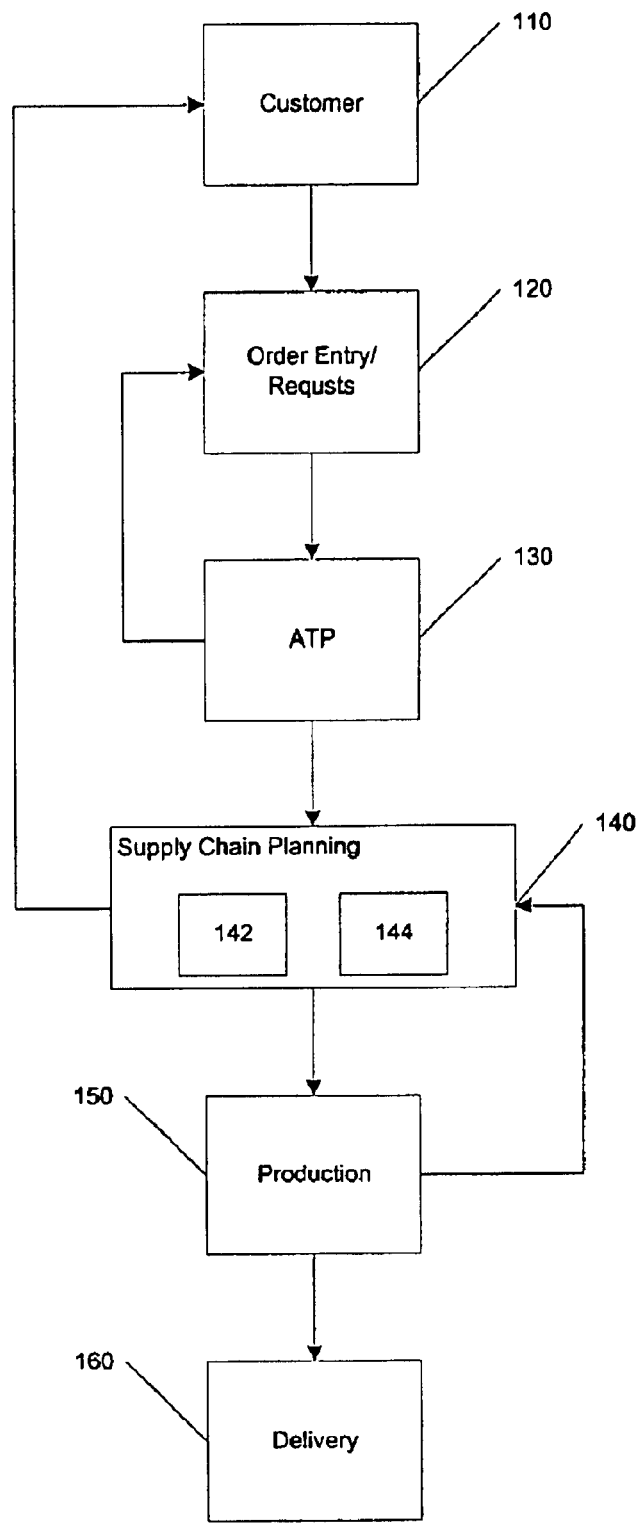
FIG. 1 illustrates a flow chart of the supply chain management process for an exemplary embodiment of the present invention.

FIG. 1 illustrates a flow chart of the supply chain management process for an exemplary embodiment of the present invention. Supply chain management process 100 begins at stage 110 with a customer requesting an order of a good or service. Throughout this description of the invention, automobiles will be the example used; however, this invention is not limited to automotive processes or goods. At stage 120, the order is entered into the system or a request for a delivery date is entered. At stage 130, the availability to promise (ATP) process determines the potential delivery date for the good. The delivery date is confirmed with the customer at stage 110, and if the delivery date is unacceptable, the process 100 returns to stage 110 so that the customer may issue a different order request. After the ATP process 130, at stage 140 supply chain planning occurs through the substages of the planning process 142 and the rescheduling process 144. Should rescheduling need to occur, the customer will be notified. The planning process 142 works in conjunction with the production process 150 for supplier and inventory management. At stage 160, the goods are delivered to the customer.

Order Entry

FIG. 2 illustrates an order matrix consistent with an embodiment of the present invention. As shown in FIG. 2, a set of orders may be represented in matrix format in an order matrix 200. Each column 210a–210n represents an order. Each row 220a–220n represents a token. For example, the token of row 220a may represent the token (color=red). To denote that an order, as represented by a column 210, contains a token, a "1" is placed in the appropriate row of the column. If an order does not contain a token, a "0" is placed in the appropriate row of the column. The storage of orders in an order matrix allows the implementation of matrix algorithms that operate on one or more orders simultaneously. It also facilitates compact storage of all orders, in matrices or as a series of orders represented by bit vectors. In addition, additions to the order matrix are simplified because additional orders are represented by simply adding a column to the end of the matrix and because additional tokens can be added to the matrix by the addition of a row. The matrix can be stored through conventional data structures or can be stored in an object-oriented fashion.

Rescheduling

The initial placement of orders may be performed through the ATP, Availability to Promise, methods described in the next section. Restrictions, comprising bottleneck resources or components, may change after production orders are placed. Capacities may change; supplier delivery may fluctuate; selection conditions may need to be altered; orders may be canceled freeing up capacity within the system; and priority orders may need to be inserted. For example, a selection condition at a restriction level may change. For instance, "Air Conditioning" may be a restriction. If air conditioning was initially an option and later becomes a standard part, this leads to a change in the selection condition of the restriction "Air Conditioning." If any of these changes occur, rescheduling may take place.

As an introduction, in order to perform a rescheduling process, the original available capacity for all restrictions is adjusted to reflect the additional capacity generated as placed orders are removed from the schedule for rescheduling. A new order restriction matrix is generated with new selection conditions accounted for. Next, the orders are rescheduled using the new order restriction matrix.

In order to determine revised production dates for a plurality of customer orders, the customer orders, from the order matrix 200, are checked against the selection criteria to determine what, if any, restrictions apply to the order. Restrictions describe available capacity of a resource or a bottleneck component for a particular period of time, such as a shift or a day.

FIG. 3 illustrates an order restriction matrix in an exemplary embodiment of the present invention. Order restriction matrix 300 has columns 310a–310n representing each order; rows 320a–320n represent restrictions. Each restriction bit vector 320 has an associated function (selection criteria) for evaluating one or more token bit vectors 220. For each function, the appropriate token bit vectors 220 from order matrix 200 are combined according to the boolean function defined by the selection criteria function. This operation is on a bit vector level, so it is performed very fast because, in the exemplary embodiment of the invention, it is performed at the machine code level. Complex database or SQL calls are not required. For example, restriction bit vector 320a may have associated with it the function, restriction bit vector 320a =Token2 AND Token6. The first restriction bit vector 320a is evaluated. The order restriction matrix explosion process determines if any more restriction bit vectors 320 remain. If so, the next restriction bit vector 320 is evaluated. If not, the process stops and the order restriction matrix 300 is complete. For each order, the appropriate restrictions for any given order can be returned from the matrix by evaluating which rows of an order have a "1". Any given order may have hundreds of applicable restrictions. The restrictions for a given order are compared to a production restriction matrix to determine candidates for a production period.

FIG. 4 illustrates a production restriction matrix in an exemplary embodiment of the present invention. Production restriction matrix 400 comprises columns 410a–410n representing time periods, such as days, shifts, or any appropriate measure. Rows 420a–420n comprise restriction vectors and correspond to the restrictions 320a–320n of order restriction matrix 300. Within each cell of production restriction matrix 400, a value is placed indicating the number of units that are free for production for that restriction 420 in that time period 410. The restrictions for each restriction vector 420 are evaluated to see if any time delay needs to be added to the PRM 400. For instance, restriction 1 may require a one-day delay after restriction 5. If so, the vector is time shifted the appropriate delay. A second vector, an evaluation bit vector 430a–430n, is introduced under each restriction vector 420 in the PRM 400 with the evaluation bit vector's entries being designated a "1" if the restriction vector entry is "1" or greater or a "0" if the restriction vector entry is a "0". Once again, the use of bit vectors facilitates the rapid calculation and evaluation which this invention provides. Each order is checked against a derivative of the restriction table to determine available dates of production.

During a rescheduling, the appropriate cells in the PRM 400 are incremented as orders are determined to be appropriate for a rescheduling. For instance, if the system determines that a rescheduling needs to be performed for every order that has been scheduled over the next two weeks. The orders are removed from the system and the PRM 400 is incremented appropriate to the removed orders. As orders are rescheduled as explained below, the PRM 400 will be appropriately decremented. As orders are placed and removed from the PRM 400, the evaluation bit vectors may be recalculated.

FIG. 5 illustrates an order derived production restriction matrix in an exemplary embodiment of the present invention. The order derived production restriction matrix (ODPRM) 500 may be a virtual table generated for each order based on the restrictions applicable to that order. The ODPRM 500 comprises columns 510a–510n representing time periods, such as days, shifts, or any appropriate measure. Rows 520a–520n comprise restriction vectors. An ODPRM may be derived for each order by using the restrictions required for a given order to identify the corresponding restriction vectors 420 from the production restriction matrix 400. This occurs in the exemplary embodiment by consulting the order restriction matrix 300 for an order and checking for entries of "1" which corresponds to a restriction that must be met.

As the restriction vectors 520 are being identified, the second vector, an evaluation bit vector 530a–530n, is identified based on the corresponding vectors 430 from the production restriction matrix 400. In order to determine possible production dates for the given order, the evaluation bit vectors 530 are ANDed into a result bit vector 540 that shows potential production periods. This operation on bit vectors yields rapid results because of the speed of bit calculations, which are performed in machine code in the exemplary embodiment of the invention. While the above description discusses the ODPRM 500 as being a table, in the exemplary embodiment of this invention the ODPRM 500 may be a virtual table comprising pointers to the corresponding vectors of PRM 400. In this fashion, memory and time are saved by not duplicating data entries. The generation of the ODPRM will be more fully explained below.

Figure 6:
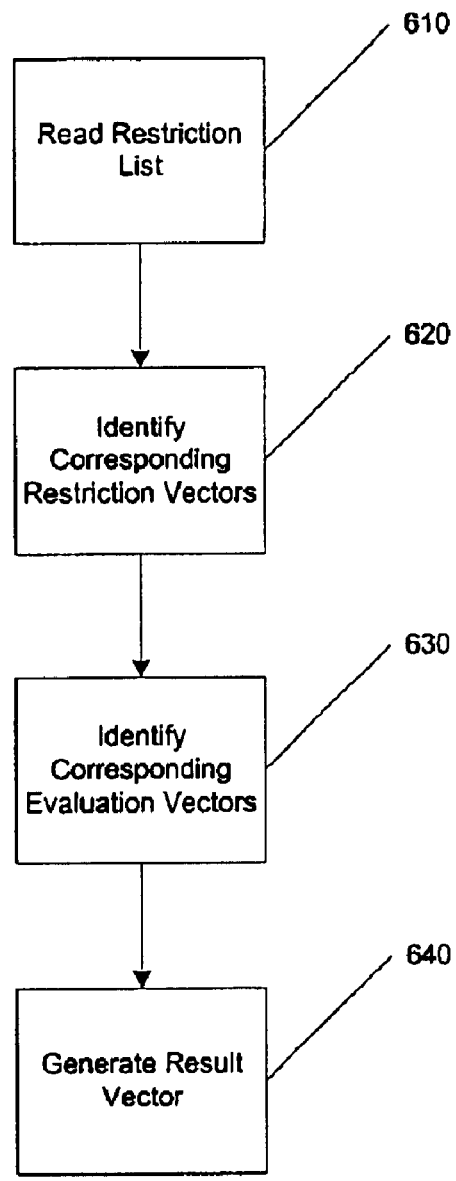
FIG. 6 is a flow chart illustrating typical stages for generating an order derived production restriction matrix consistent with an embodiment of the present invention.

FIG. 6 is a flow chart illustrating typical stages for generating an order derived production restriction matrix consistent with an embodiment of the present invention. ODPRM process 600 commences at stage 610 by reading the list of restrictions for a given order from the order restriction matrix 300. At stage 620, the corresponding restriction vectors 420 from the production restriction matrix 400 are identified to the ODPRM 500. At stage 630, the corresponding evaluation bit vectors 430 from the production restriction matrix 400 are identified to the ODPRM 500. At stage 640, the ODPRM process 600 logically ANDs the evaluation bit vectors to generate a result bit vector 540. The result bit vector contains all of the possible time periods of possible production.

Thus, at a glance the earliest, latest, or production date closest to the desired delivery date can be determined for each order. The above process is repeated during a rescheduling for each order in order matrix 200 that meets a particular criteria, e.g. rescheduling every order in the next two week period. When an order is actually rescheduled, the appropriate entries in the production restriction matrix 400 are decremented by the appropriate count.

Availability to Promise (ATP)

It is also useful to be able to determine an available delivery time for a customer order. In order to find an available delivery time, a suitable production date must be calculated followed by the addition of safety and transport times. This yields a confirmed delivery date. In order to determine a production date for a customer order, the customer order is checked against the selection criteria to determine what, if any, restrictions apply to the order. Restrictions describe available capacity of a resource or a bottleneck component for a particular period of time, such as a shift or a day.

The ATP process is the same as the above Rescheduling Process except that it is done for a single order. There is no need to generate an order matrix 200 or a restriction matrix 300. As an order is entered by the requesting party, a token bit vector associated with the order will be converted to a restriction bit vector (not a restriction matrix). This restriction bit vector is then used to generated the ODPRM 500 for the single order. An order can then be placed in the appropriate period as explained above with reference to FIG. 5.

It should be noted throughout these processes that reuse of information wherever possible is desirable. For instance, once a restriction vector is generated for an order in the order process, or at any time, the restriction vector may be reused, e.g., in the rescheduling process.

Supply Chain Planning

Once an order is placed, a bill of materials matrix is used for supply chain planning. FIG. 7 illustrates a bill of materials matrix consistent with an embodiment of the present invention. The order matrix may be projected to generate the set of material requirements for the orders. This process is described herein as "exploding" the order matrix to obtain the bill of materials (BOM) matrix 200. Each column 710a–710n in the BOM matrix 700 represents an order (corresponding to the orders 110a–110n in the order matrix 100; each row 720a–720n in the matrix represents an item. Each item 720 denotes some or all of the following information: component information, effectivity date, and/or selection condition. Component information may include material number, quantity, restriction number, activity number or any other information regarding the component. The effectivity date is the date on which an item is available and contains values representing a validity start point and a validity end point. Selection condition is a logical function applied to item values, e.g., Token1 AND Token5 OR NOT Token18.

In general, the order matrix 100 is exploded in the bill of materials matrix 700 as follows, with a more detailed discussion of the process to be discussed later. For example, each order for a luxury model red car with standard transmission will require that 100,000 different individual components be on hand. The list of individual components is referred to as the bill of materials. Intuitively, the bill of materials for a luxury model red car will differ from that for a basic model black car. The luxury model, for example, may require a sun roof, leather seats, and automatic windows whereas the basic model may not.

The manufacturer obtains each of the individual components from a wide variety of different component suppliers. To complicate matters further, the manufacturer may use more than one supplier to supply a particular component. Using multiple suppliers, allows the manufacturer a certain degree of flexibility in case one supplier cannot handle the manufacturer's demand. Also, manufacturers frequently change suppliers and/or style of components at certain time intervals. Using the auto example, a manufacturer may decide to phase out sealed beam headlights after June $30^{th}$ and, as of July $1^{st}$, to begin using halogen headlights. The item lines 720a and 720b in the bill of material matrix 700, for example, shows that Item 1 has two different effectivity periods: "EN__1" and "EN__2". If, for example, a customer orders a new auto to be delivered before July $1^{st}$, the bill of materials for this auto with normal headlights would show an indication, a "1", in the box for "Item__1/EN__1" 720a/710a whereas orders to be manufactured after July $1^{st}$ would show an indication in the row marked "Item__1/EN__2" 720b/710a.

FIG. 8 illustrates an effectivity matrix consistent with an embodiment of the present invention. Effectivity matrix 800 is generated to produce a matrix 800 corresponding in number of columns and rows to the BOM matrix 700. The effectivity matrix 800 contains 1's in each order column 710 that falls within the effectivity date range for each item 720. The remaining entries of the effectivity matrix contain 0's. This effectivity matrix 800 will be used in the explosion process, the generation of the bill of materials matrix 700 from the order matrix 100, as a mask in a logical AND process.

Figure 9:
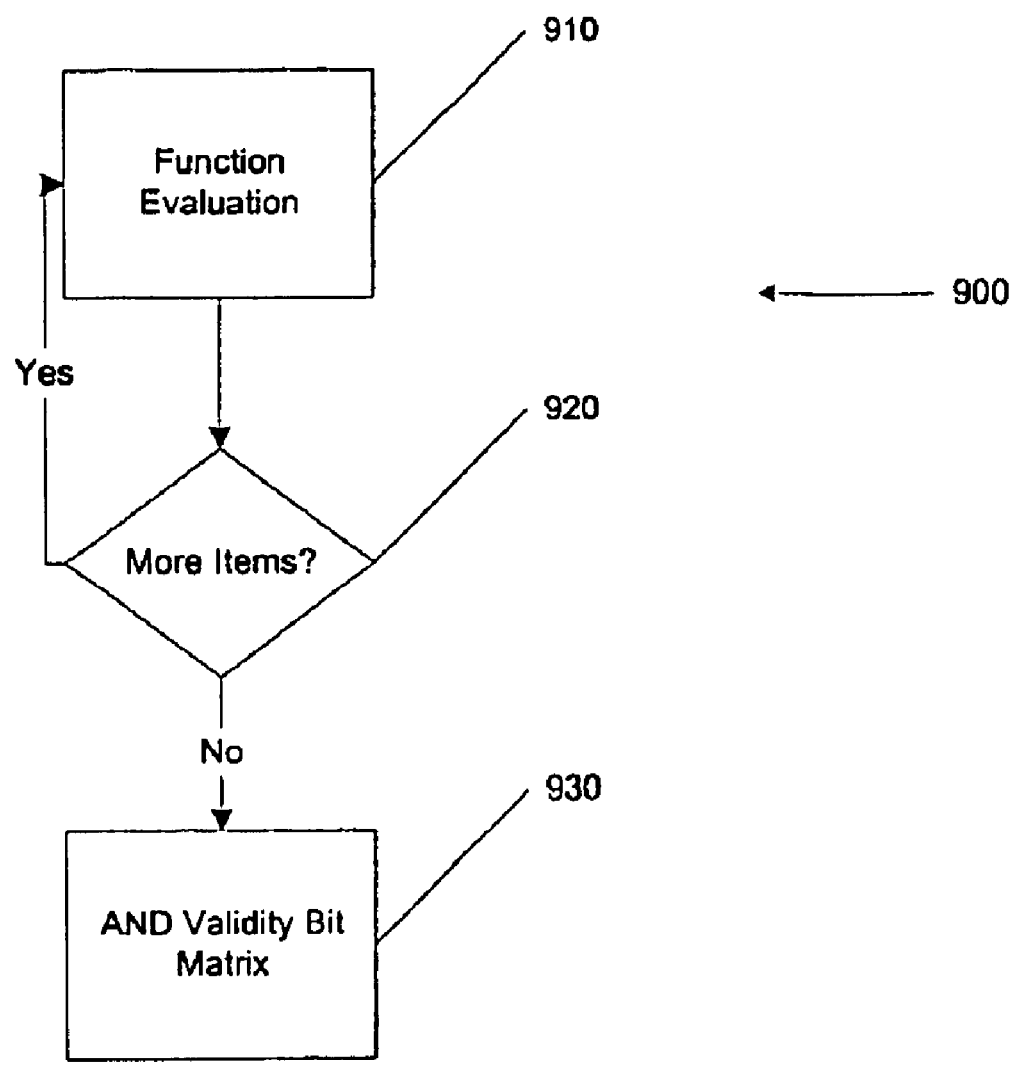
FIG. 9 is a flow chart illustrating typical stages for exploding an order matrix into a bill of materials matrix consistent with an embodiment of the present invention.

FIG. 9 is a flow chart illustrating typical stages for exploding an order matrix into a bill of materials matrix consistent with an embodiment of the present invention. In stage 910, each item bit vector 720 has an associated function for evaluating one or more token bit vectors 120. For example, as previously mentioned, item bit vector 720a may have associated with it the function, Item bit vector 720a=Token1 AND Token5 OR NOT Token18. At stage 910, the first item bit vector 720 is evaluated. At stage 920, BOM explosion process 900 determines if any more item bit vectors 720 remain. If so, processing returns to stage 910 and the next item bit vector 720 is evaluated If not, at stage 930, the validity bit matrix 800 is ANDed with the BOM matrix 700 with the results returned to the BOM matrix 700. This serves to mask the BOM matrix leaving logical 1's only in the appropriate item bit vectors 720 for a given effectivity period.

The resulting bill of materials matrix 700 is a complete accounting of all materials needed to process all orders. Because it uses logical operation on bit arrays, it is a very fast process. In addition, because the processing time of BOM explosion process 900 is approximately proportional to the number of items in the bill of materials, and is only weakly dependent on the number of orders (columns), the process runs at essentially the same fast speed regardless of the number of orders entered. Also, by calculating the every item bit vector 720 for each order once, the BOM matrix 700 for all production orders is set in one run of the BOM explosion process 900. Following BOM explosion process 900, the bill of materials for each order can be accessed and utilized by simply reading an order (column) entry.

Because of the rapid execution of BOM explosion process 900 due to its logical evaluation of bit arrays, the process 900 may be re-executed as orders change, new orders are added, effectivity dates change, or selection condition change without requiring downtime or a loss of production while waiting for complex processing of data as in the prior art.

The BOM may be used in a wide variety of production and inventory planning functions. The BOM can be used to automatically order materials from just-in-time suppliers or to automatically decrement inventory counts in the warehouse or production line as completed orders are processed out of a production facility.

Historical Change in Selection Conditions

Selection conditions at a restriction level may change over time which causes complications in both the ATP process and the rescheduling process. For instance, alloy wheels may be a restriction tied to a sports package, but not a luxury package, for a car during the first half of the year; but, during the second half of the year alloy wheels become a restriction tied to a luxury package, but no longer a sports package. If an order for a sports package is scheduled for production during the first half of the year, alloy wheels will be required; however, if the sports package is scheduled for the second half of the year, alloy wheels are not required. Similarly, if an order for a luxury package is scheduled for production during the first half of the year, alloy wheels are not required; however, if the luxury package car is scheduled for production during the second half of the year, alloy wheels are required. This poses a business problem of how does one perform the ATP or rescheduling process previously described if one does not know which effectivity restriction to apply because the effectivity restriction to apply is based on the result of the ATP or rescheduling process. This invention proposes a novel solution to this nonlinear problem by constructing a matrix that includes vector bit mask entries for each restriction/effectivity combination.

Figure 10:
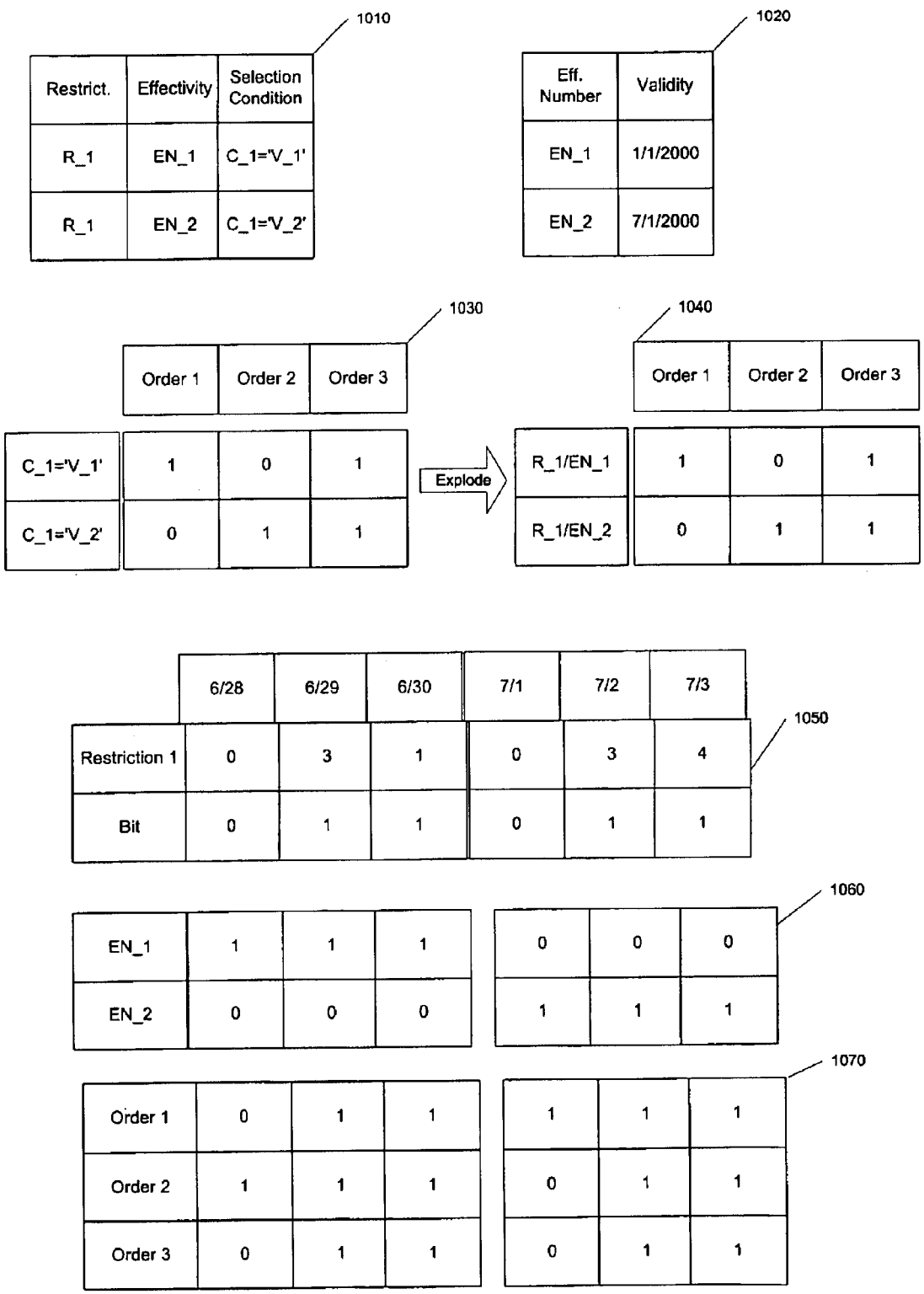
FIG. 10 is a plurality of tables illustrating a system of checking availability with historical selection conditions in which features and principles of the present invention may be implemented.

FIG. 10 is a plurality of tables illustrating a system of checking availability with historical selection conditions in which features and principles of the present invention may be implemented. In this example, two selection conditions are illustrated using two tokens: characteristic 1 is V_1 (C_1=V_1); and characteristic 1 is V_2 (C_1=V_2). For instance V_1 might be a sports package and V_2 might be a luxury package. Restriction table 1010 illustrates that that restriction 1, possibly alloy wheels, is applicable during effectivity period 1, EN_1, when C_1=V_1 and that restriction 1 is applicable during effectivity period 2, EN_2, when C_1=V_2. Effectivity table 1020 illustrates that effectivity period 1, EN_1, is valid from Jan, 1, 2000 to Jun. 30, 2000 and that effectivity period 2, EN_2, is valid beginning on Jul. 1, 2000. In other words, a sports package invokes restriction 1 during the first half of the year and a luxury package invokes restriction 1 during the second half of the year.

Order matrix 1030 illustrates the order matrix for three orders to be placed. Order 1 invokes the first token; order 2 invokes the second token; and order 3 invokes the first and second token. Order restriction matrix 1040 is the result of the explosion of the order matrix 1030 which takes place as previously described.

Production restriction matrix 1050 is constructed as earlier described. Effectivity matrix 1060 is amended to the production restriction matrix 1050 and serves as a mask. For periods in which the effectivity is true, one's are placed in the cells of the matrix; for periods in which the effectivity is false, zero's are placed in the cells of the matrix.

In the next stage, resulting matrix 1070 is constructed by logically evaluating the restriction bit rows of the production restriction matrix 1050 with the effectivity matrix 1060 and the order restriction matrix 1040. Table 1070 is generated by the following process for each order:

For the order to be checked, read the corresponding column from Table 1040;

For each "1" entry, select both the corresponding evaluation bit vector from the restriction matrix 1050 and the bit mask vector from matrix 1060 and combine them with the OR NOT function to reach an intermediate result bit vector;

AND all of the intermediate result bit vectors yielding the result bit vectors in matrix 1070; and Repeat for each order.

In this example, Table 1040 shows that Order 1 invokes effectivity 1 only. Therefore, take the bit vector from Table 1050 (011011) and OR this with NOT (111000), yielding (011111). Thus, Order 1 can be fulfilled anytime on or after June 29. Order 2 invokes effectivity 2 only. Therefore, take the bit vector from Table 1050 (011011) and OR this with NOT (000111), yielding (111011). Thus, Order 2 can be fulfilled anytime prior to or after July 1. Order 3 invokes effectivity 1 and 2. Therefore, take the logical AND of ((011011) OR NOT (111000)) and ((011011) OR NOT (000111)) to yield (011011). This makes logical sense because Order 3 is requesting both a luxury and a sport package so that no matter when the order is placed, alloy wheels are required.

Once an order is placed or rescheduled by choosing an available production slot, as determined from Table 1070, one must determine whether the Table 1050 entry needs to be decremented. The table only needs to be decremented if the production slot corresponds to a production slot where the effectivity/restriction combination for that order is a "1". For example, examining table 1070, one may decide to place order 1 on June 29. If this is the case, we examine the entry in table 1040 to note that order 1 requires restriction 1 during this effectivity period, prior to July 1. Therefore, restriction 1 in table 1050 needs to be decremented on June 29. Likewise, if order 2 is placed on June 29, we examine the entry in table 1040 to note that order 2 only has restriction 1 during effectivity period 2; therefore, since the order is being placed during effectivity period 1, no decrement is necessary. Placing order 2 on June 29 does not require the restriction of alloy 2.

Implementation

The above-noted features and other aspects and principles of the present invention may be implemented in various system or network environments to provide automated computational tools to facilitate data collection and risk analysis. Such environments and applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques. The present invention also relates to computer readable media that include program instruction or program code for performing various computer-implemented operations based on the methods and processes of the invention. The media and program instructions may be those specially designed and constructed for the purposes of the invention, or they may be of the kind well-known and available to those having skill in the computer software arts. Examples of program instructions include both machine code, such as produced by compiler, and files containing a high level code that can be executed by the computer using an interpreter.

Figure 11:
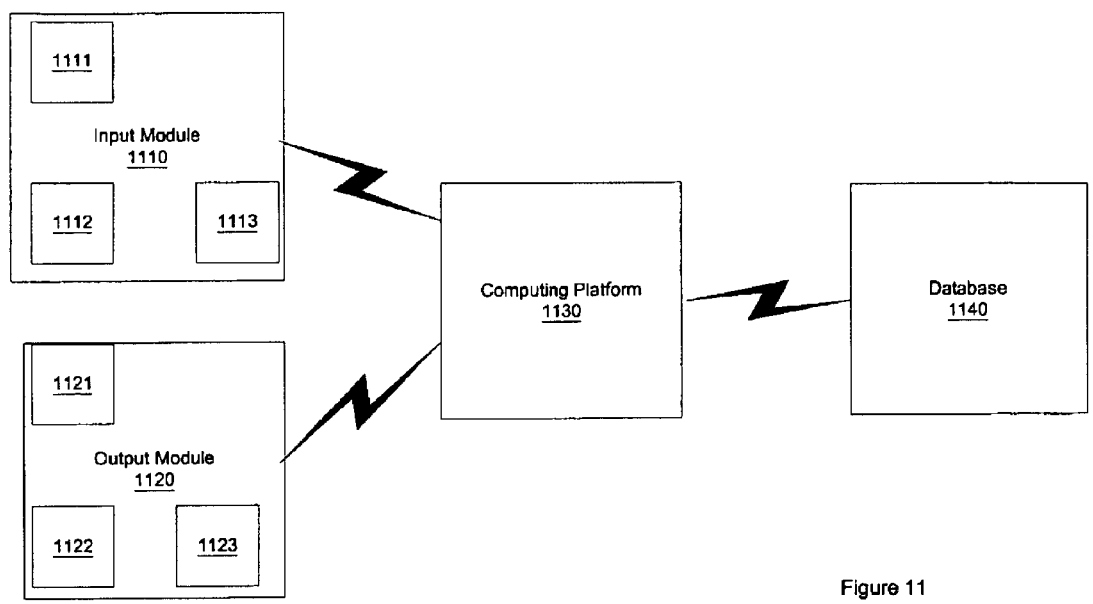
FIG. 11 illustrates a system environment in which the features and principles of the present invention may be implemented.

By way of a non-limiting example, FIG. 11 illustrates a system environment in which the features and principles of the present invention may be implemented. As illustrated in the block diagram of FIG. 11, a system environment consistent with the present invention includes an input module 1110, an output module 1120, a computing platform 1110, and a database 1140. Computing platform 1130 is adapted to include the necessary functionality and computing capabilities to analyze each users information or data provided through input module 1110 and determine fitting gear using database 1140. The results of analyzing the data are provided as output from computing platform 1130 to output module 1120 for printed display, viewing or further communication to other system devices. Output from computing platform 1130 can also be provided to database 1140, which may be utilized as a persistent storage device for storing data.

In the embodiment of FIG. 11, computing platform 1130 preferably comprises a PC or mainframe computer for performing various functions and operations of the invention. Computing platform 1130 may be implemented, for example, by a general purpose computer selectively activated or reconfigured by a computer program stored in the computer, or may be a specially constructed computing platform for carrying-out the features and operations of the present invention. Computing platform 1130 may also be implemented or provided with a wide variety of components or subsystems including, for example, one or more of the following: one or more central processing units, a co-processor, memory, registers, and other data processing devices and subsystems. Computing platform 1130 also communicates or transfers data to and from input module 1110 and output module 1120 through the use of direct connections or communication links, as illustrated in FIG. 11.

Input module 1110 of the system environment may shown in FIG. 11 be implemented with a wide variety of devices to receive and/or provide the data as input to computing platform 1130. As illustrated in FIG. 11, input module 1110 includes an input device 1111, a storage device 1112, and/or a network interface 1111. Input device 1111 may comprise a keyboard, a mouse, a disk drive, video camera, magnetic card reader or any other suitable input device for providing customer data to computing platform 1130. Memory device may be implemented with various forms of memory or storage devices, such as read-only memory (ROM) devices and random access memory (RAM) devices. Storage device 1112 may include a memory tape or disk drive for reading and providing customer or credit data on a storage tape or disk as input to computing platform 1130. Input module 1110 may also include network interface 1111, as illustrated in FIG. 11, to receive data over a network (such as a LAN, WAN, intranet or the Internet) and to provide the same as input to computing platform 1130. For example, network interface 1111 may be connected to a public or private database over a network for the purpose of receiving and transferring data to computing platform 1130.

As illustrated in FIG. 11, output module 1120 includes a display 1121, a printer device 1122, and/or a network interface 1123 for receiving the results provided as output from computing module 1120. As indicated above, the output from computing platform 1130 may include one or more items. The output from computing platform 1130 may be displayed or viewed through display 1121 (such as a CRT or LCD) and printer device 1122. If needed, network interface 1123 may also be provided to facilitate the communication of the results from computer platform 1130 over a network (such as a LAN, WAN, intranet or the Internet) to remote or distant locations for further analysis or viewing.

The foregoing description of embodiments of the invention has been presented for purposes of illustration and description. It is not exhaustive and does not limit the invention to the precise form disclosed. Modifications and variations are possible in light of the above teachings or may be acquired from practicing of the invention. For example, the described implementation includes a particular network configuration but the present invention may be implemented in a variety of data communication network environments using software, hardware or a combination of hardware and software to provide the processing functions.

Those skilled in the art will appreciate that all or part of systems and methods consistent with the present invention may be stored on or read from other computer-readable media, such as secondary storage devices, like hard disks, floppy disks, and CD-ROM; a carrier wave received from the Internet; or other forms of computer-readable memory, such as read-only memory (ROM) or random-access memory (RAM).

Furthermore, one skilled in the art will also realize that the processes illustrated in this description may be implemented in a variety of ways and include multiple other modules, programs, applications, scripts, processes, threads, or code sections that all functionally interrelate with each other to accomplish the individual tasks described above for each module, script, and daemon. For example, it is contemplated that these programs modules may be implemented using commercially available software tools, using custom object-oriented code written in the C++ programming language, using applets written in the Java programming language, or may be implemented as with discrete electrical components or as one or more hardwired application specific integrated circuits (ASIC) custom designed just for this purpose.

In the foregoing Description of Preferred Embodiments, various features of the invention are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Description of the Preferred Embodiments, with each claim standing on its own as a separate preferred embodiment of the invention.

What is claimed is:

1. A method of generating an order matrix, the method comprising:
    receiving an order comprising one or more tokens out of a set of possible tokens, wherein a token is a combination of a characteristic and a value of the characteristic; and
    using a computer to place the order in an order matrix, wherein the order matrix is at least a two dimensional data structure, each row of the data structure representing a possible token and each column of the data structure representing an order.

2. The method of claim 1 wherein each entry in the order matrix is a single logical bit.

3. The method of claim 1, further comprising inserting a new row into the order matrix, wherein the new row represents a new possible token, such that a new token can be introduced into a pre-existing order matrix.

4. The method of claim 1, further comprising storing the order matrix in an object-oriented fashion.

5. A method of rescheduling a production period for a plurality of orders, the method comprising:
    receiving a plurality of orders comprising one or more tokens out of a set of possible tokens, wherein a token is a combination of a characteristic and a value of the characteristic;
    generating an order restriction matrix for the orders, wherein the order restriction matrix is at least a two dimensional data structure, each row of the data structure representing a possible restriction and each column of the data structure representing an order;

determining the restrictions that apply to the orders; and
using a computer to apply the restrictions to a production restriction matrix to determine potential production periods for the orders.

6. The method of claim 5, wherein generating an order restriction matrix further comprises logically evaluating the associated function for each possible restriction.

7. The method of claim 5, wherein determining the restrictions that apply to the orders comprises analyzing the order restriction matrix column of the orders for all restrictions that are logically true.

8. The method of claim 5, wherein applying the restrictions to a production restriction matrix to determine potential production periods for the orders comprises:

generating an order derived production restriction matrix from the production restriction matrix, the production restriction matrix being at least a two dimensional data structure, rows of the data structure representing a possible restriction and columns of the data structure representing a production period, the generation comprising:

for each restriction of an order, identifying the appropriate row of the production restriction matrix to include in the order derived production restriction matrix; and evaluating the order derived production restriction matrix to determine potential periods for production.

9. The method of claim 8, wherein the production restriction matrix further comprises an evaluation bit vector row for each restriction vector row, said evaluation bit vector row generated by:

for each entry in the restriction vector row place a 1 in the associated evaluation bit vector row if the entry in the restriction vector row is 1 or greater; and for each entry in the restriction vector row place a 0 in the associated evaluation bit vector row if the entry in the restriction vector row is 0 or less.

10. The method of claim 9, wherein evaluating the order derived production restriction matrix to determine potential production periods for the order comprises:

logically ANDing the evaluation bit vector rows;
placing the result in a result bit vector; and
analyzing the result bit vector to determine the production periods having an entry of 1 within the result bit vector, wherein a 1 designates a potential production period.

11. The method of claim 5, further comprising the stage of decrementing the production restriction matrix when a production period is chosen.

12. A method of generating a bill of materials for a production run, the method comprising:

receiving a plurality of orders comprising one or more tokens out of a set of possible tokens, wherein a token is a combination of a characteristic and a value of the characteristic;

placing the orders in an order matrix, wherein the order matrix is at least a two dimensional data structure, each row of the data structure representing a possible token and each column of the data structure representing an order; and using a computer to generate a bill of materials matrix by evaluating the order matrix, wherein the bill of materials matrix is at least a two dimensional data structure, each row of the data structure representing a possible item and each column of the data structure representing an order.

13. The method of claim 12, wherein generating the bill of materials matrix further comprises:

for each item vector, each item vector having an associated evaluation function, performing the evaluation function on the token parameters from the order matrix; and placing the result of the evaluation in the item vector of the bill of materials matrix.

14. The method of claim 12, further comprising the stage of analyzing the bill of materials matrix to determine supply requirements.

15. The method of claim 12, further comprising the stage of decrementing an inventory database as each order is processed based on the items in the bill of materials matrix.

16. A computer for generating an order matrix, comprising:

a processor; and
a memory storage device coupled to the processor;
the processor being operative to:
receive an order comprising one or more tokens out of a set of possible tokens, wherein a token is a combination of a characteristic and a value of the characteristic; and place the order in an order matrix, wherein the order matrix is at least a two dimensional data structure, each row of the data structure representing a possible token and each column of the data structure representing an order.

17. A computer for rescheduling a production period for orders, comprising:

a processor; and
a memory storage device coupled to the processor;
the processor being operative to:
receive orders comprising one or more tokens out of a set of possible tokens, wherein a token is a combination of a characteristic and a value of the characteristic;

generate an order restriction matrix for the orders, wherein the order restriction matrix is at least a two dimensional data structure, each row of the data structure representing a possible restriction and each column of the data structure representing an order;

determine the restrictions that apply to the orders; and
apply the restrictions to a production restriction matrix to determine potential production periods for the orders.

18. A computer for generating a bill of materials, comprising:

a processor; and
a memory storage device coupled to the processor;
the processor being operative to:
receive a plurality of order comprising one or more tokens out of a set of possible tokens, wherein a token is a combination of a characteristic and a value of the characteristic;

place the orders in an order matrix, wherein the order matrix is at least a two dimensional data structure, each row of the data structure representing a possible token and each column of the data structure representing an order; and generate a bill of materials matrix by evaluating the order matrix, wherein the bill of materials matrix is at least a two dimensional data structure, each row of the data structure representing a possible item and each column of the data structure representing an order.

19. The computer of claim 18, wherein the processor is further operative to:

for each item vector wherein each item vector has an associated evaluation function that evaluates token parameters, perform the evaluation function on the token parameters from the order matrix; and place the result of the evaluation in the item vector of the bill of materials matrix.

20. A computer-readable medium containing instructions for generating an order matrix, the instructions comprising:

receiving an order comprising one or more tokens out of a set of possible tokens, wherein a token is a combination of a characteristic and a value of the characteristic; and placing the order in an order matrix, wherein the order matrix is at least a two dimensional data structure, each row of the data structure representing a possible token and each column of the data structure representing an order.

21. The computer-readable medium of claim 20, wherein each entry in the order matrix is a single logical bit.

22. The computer-readable medium of claim 20, further comprising the stage of inserting a new row into the order matrix, wherein the new row represents a new possible token, such that a new token can be introduced into a pre-existing order matrix.

23. The computer-readable medium of claim 20, further comprising the stage of storing the order matrix in an object-oriented fashion.

24. A computer-readable medium containing instructions for determining a production period for an order, the instructions comprising:

receiving a plurality of orders comprising one or more tokens out of a set of possible tokens, wherein a token is a combination of a characteristic and a value of the characteristic;

generating an order restriction matrix for the orders, wherein the order restriction matrix is at least a two dimensional data structure, each row of the data structure representing a possible restriction and each column of the data structure representing an order;

determining the restrictions that apply to the orders; and applying the restrictions to a production restriction matrix to determine potential production periods for the orders.

25. The computer-readable medium of claim 24, wherein generating an order restriction matrix further comprises logically evaluating the associated function for each possible restriction.

26. The computer-readable medium of claim 24, wherein determining the restrictions that apply to the order comprises analyzing the order restriction matrix column of the order for all restrictions that are logically true.

27. The computer-readable medium of claim 24, wherein deriving an order derived production restriction matrix for the order comprises:

generating an order derived production restriction matrix from the production restriction matrix, the production restriction matrix being at least a two dimensional data structure, rows of the data structure representing a possible restriction and columns of the data structure representing a production period, by the stages of:

for each restriction of an order, identifying the appropriate row of the production restriction matrix to include in the order derived production restriction matrix; and evaluating the order derived production restriction matrix to determine potential periods for production.

28. The computer-readable medium of claim 27, wherein the production restriction matrix further comprises an evaluation bit vector row for each restriction vector row, said evaluation bit vector row generated by the stages of:

for each entry in the restriction vector row place a 1 in the associated evaluation bit vector row if the entry in the restriction vector row is 1 or greater; and for each entry in the restriction vector row place a 0 in the associated evaluation bit vector row if the entry in the restriction vector row is 0 or less.

29. The computer-readable medium of claim 24, wherein the stage of evaluating the order derived production restriction matrix to determine potential production periods for the order comprises the stages of:

logically ANDing the evaluation bit vectors;

placing the result in a result bit vector;

analyzing the result bit vector to determine the production periods having an entry of 1 within the result bit vector, wherein a 1 designates a potential production period.

30. The computer-readable medium of claim 24, further comprising the stage of decrementing the production restriction matrix when a production period is chosen.

31. A computer-readable medium containing instructions for generating a bill of materials for a production run, the instructions comprising:

receiving a plurality of orders comprising one or more tokens out of a set of possible tokens, wherein a token is a combination of a characteristic and a value of the characteristic;

placing the orders in an order matrix, wherein the order matrix is at least a two dimensional data structure, each row of the data structure representing a possible token and each column of the data structure representing an order; and generating a bill of materials matrix by evaluating the order matrix, wherein the bill of materials matrix is at least a two dimensional data structure, each row of the data structure representing a possible item and each column of the data structure representing an order.

32. The computer-readable medium of claim 31, wherein generating the bill of materials matrix further comprises:

for each item vector wherein each item vector has an associated evaluation function that evaluates token parameters, performing the evaluation function on the token parameters from the order matrix; and placing the result of the evaluation in the item vector of the bill of materials matrix.

33. The computer-readable medium of claim 31, further comprising analyzing the bill of materials matrix to determine supply requirements.

34. The computer-readable medium of claim 31, further comprising decrementing an inventory database as each order is processed based on the items in the bill of materials matrix.

35. A method of scheduling a production period for an order, the method comprising:

receiving an order comprising one or more tokens out of a set of possible tokens, wherein a token is a combination of a characteristic and a value of the characteristic;

determining the restrictions that apply to the order; and using a computer to apply the restrictions to a production restriction matrix to determine potential production periods for the order.

36. The method of claim 35, wherein determining the restrictions that apply to the order comprises evaluating a selection criteria function with the one or more tokens as parameters for each respective restriction.

37. The method of claim 35, wherein applying the restrictions to a production restriction matrix to determine potential production periods for the orders comprises:
- generating an order derived production restriction matrix from the production restriction matrix, the production restriction matrix being at least a two dimensional data structure, rows of the data structure representing a possible restriction and columns of the data structure representing a production period, by:
  - for each restriction of an order, identifying the appropriate row of the production restriction matrix to include in the order derived production restriction matrix; and
  - evaluating the order derived production restriction matrix to determine potential periods for production.

38. The method of claim 37, wherein the production restriction matrix further comprises an evaluation bit vector row for each restriction vector row, said evaluation bit vector row generated by:
- for each entry in the restriction vector row place a 1 in the associated evaluation bit vector row if the entry in the restriction vector row is 1 or greater; and
- for each entry in the restriction vector row place a 0 in the associated evaluation bit vector row if the entry in the restriction vector row is 0 or less.

39. The method of claim 38, wherein evaluating the order derived production restriction matrix to determine potential production periods for the order comprises:
- logically ANDing the evaluation bit vector rows;
- placing the result in a result bit vector; and
- analyzing the result bit vector to determine the production periods having an entry of 1 within the result bit vector, wherein a 1 designates a potential production period.

40. The method of claim 35, further comprising the stage of decrementing the production restriction matrix when a production period is chosen.

41. A computer for scheduling an order, comprising:
- a processor; and
- a memory storage device coupled to the processor;
- the processor being operative to:
  - receive an order comprising one or more tokens out of a set of possible tokens, wherein a token is a combination of a characteristic and a value of the characteristic;
  - determine the restrictions that apply to the order; and
  - apply the restrictions to a production restriction matrix to determine potential production periods for the order.

42. The computer of claim 41, wherein the processor is further operative to evaluate a selection criteria function with the one or more tokens as parameters for each respective restriction.

43. The computer of claim 41, wherein the processor is further operative to:
- generating an order derived production restriction matrix from the production restriction matrix, the production restriction matrix being at least a two dimensional data structure, rows of the data structure representing a possible restriction and columns of the data structure representing a production period, the generation comprising:
  - for each restriction of an order, identifying the appropriate row of the production restriction matrix to include in the order derived production restriction matrix; and
  - evaluating the order derived production restriction matrix to determine potential periods for production.

44. The computer of claim 41, wherein the processor is further operative to generate an evaluation bit vector row for each restriction vector row, said evaluation bit vector row generated by:
- for each entry in the restriction vector row place a 1 in the associated evaluation bit vector row if the entry in the restriction vector row is 1 or greater; and
- for each entry in the restriction vector row place a 0 in the associated evaluation bit vector row if the entry in the restriction vector row is 0 or less.

45. The computer of claim 44, wherein the processor is further operative to:
- logically AND the evaluation bit vector rows;
- place the result in a result bit vector; and
- analyze the result bit vector to determine the production periods having an entry of 1 within the result bit vector, wherein a 1 designates a potential production period.

46. The computer of claim 41, wherein the processor is further operative to decrement the production restriction matrix when a production period is chosen.

47. A computer-readable medium containing instructions for scheduling an order, the instructions comprising:
- receiving an order comprising one or more tokens out of a set of possible tokens, wherein a token is a combination of a characteristic and a value of the characteristic;
- determining the restrictions that apply to the order; and
- applying the restrictions to a production restriction matrix to determine potential production periods for the order.

48. The computer-readable medium of claim 47, wherein the instruction for determining the restrictions that apply to the order comprises the instruction of evaluating a selection criteria function with the one or more tokens as parameters for each respective restriction.

49. The computer-readable medium of claim 47, wherein the instruction for applying the restrictions to a production restriction matrix to determine potential production periods for the orders comprises the instruction of:
- generating an order derived production restriction matrix from the production restriction matrix, the production restriction matrix being at least a two dimensional data structure, rows of the data structure representing a possible restriction and columns of the data structure representing a production period, by:
  - for each restriction of an order, identifying the appropriate row of the production restriction matrix to include in the order derived production restriction matrix; and
  - evaluating the order derived production restriction matrix to determine potential periods for production.

50. The computer-readable medium of claim 49, wherein the production restriction matrix further comprises an evaluation bit vector row for each restriction vector row, said evaluation bit vector row generated by the instruction of:
- for each entry in the restriction vector row place a 1 in the associated evaluation bit vector row if the entry in the restriction vector row is 1 or greater; and
- for each entry in the restriction vector row place a 0 in the associated evaluation bit vector row if the entry in the restriction vector row is 0 or less.

51. The computer-readable medium of claim 50, wherein the instruction for evaluating the order derived production restriction matrix to determine potential production periods for the order comprises the instructions of:
- logically ANDing the evaluation bit vector rows;
- placing the result in a result bit vector; and
- analyzing the result bit vector to determine the production periods having an entry of 1 within the result bit vector, wherein a 1 designates a potential production period.

52. The computer-readable medium of claim 47, further comprising the instruction of decrementing the production restriction matrix when a production period is chosen.

* * * * *